United States Patent [19]

McQueen et al.

[11] 4,441,293
[45] Apr. 10, 1984

[54] CONSTRUCTION PANELS

[75] Inventors: George McQueen, Paisley, Scotland; Victor E. Barrable, Gerrards Cross, England

[73] Assignee: Cape Boards & Panels Limited, Middlesex, England

[21] Appl. No.: 371,304

[22] PCT Filed: Aug. 21, 1981

[86] PCT No.: PCT/GB81/00162
§ 371 Date: Apr. 12, 1982
§ 102(e) Date: Apr. 12, 1982

[87] PCT Pub. No.: WO82/00679
PCT Pub. Date: Mar. 4, 1982

[30] Foreign Application Priority Data
Aug. 13, 1980 [GB] United Kingdom ............... 8026445

[51] Int. Cl.³ .............................................. E04B 5/00
[52] U.S. Cl. ........................................ 52/377; 52/586; 52/741
[58] Field of Search ................ 52/585, 586, 506, 377, 52/741, 376; 411/471, 472, 457; 404/28, 31

[56] References Cited

U.S. PATENT DOCUMENTS 2,031,249 2/1936 Bowman ............................... 404/31
3,113,401 12/1963 Rose ..................................... 52/586
3,190,170 6/1965 Baum ............................. 411/457 X Primary Examiner—John E. Murtagh
Assistant Examiner—Kathryn L. Ford
Attorney, Agent, or Firm—Frost & Jacobs

[57] ABSTRACT

A construction panel comprises a non-combustible fire-resisting board e.g. of fibre-reinforced cement or calcium silicate binder, faced on one or both of its major faces with a metal facing. A "floating floor" for marine use is formed by joining the panels in edgewise abutting relationship. The joint is suitably formed by providing each panel with edge grooves placing the panels in edgewise abutting relationship, inserting a spline into the edge grooves of adjacent abutting panels and driving a staple into the abutting panels such that the limbs of the staple are deflected upon contacting the spline. The assembly of panels is suitably supported on a mass of mineral wool.

3 Claims, 4 Drawing Figures

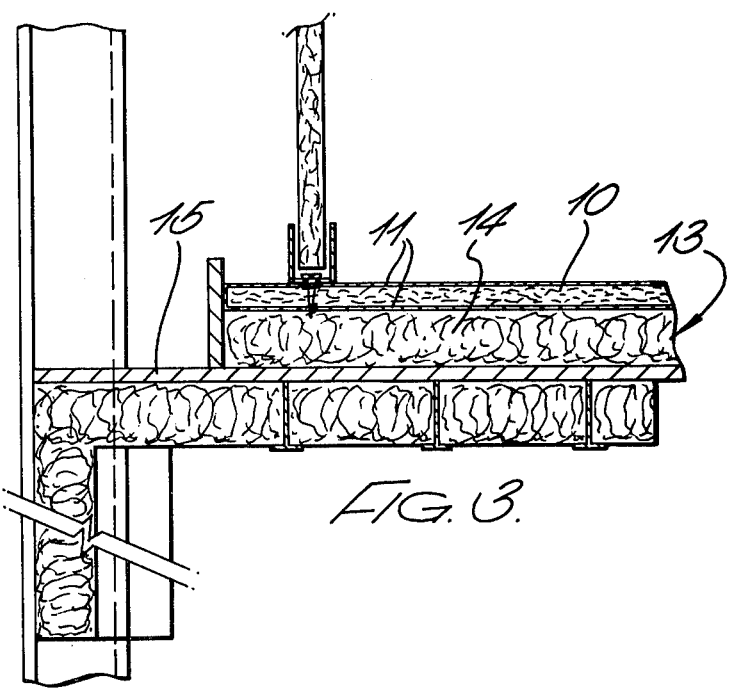
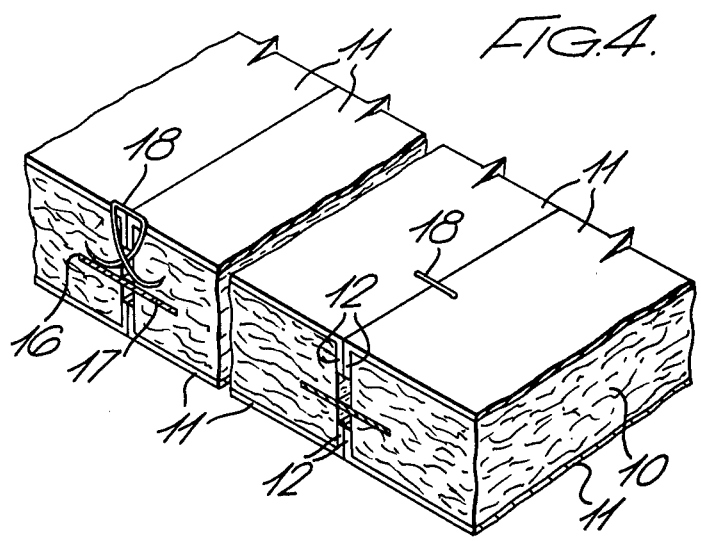

CONSTRUCTION PANELS

This invention relates to construction panels, and to their use in the formation of "floating floors". The invention also relates to a method of jointing construction panels.

On board ship there has been a move in recent years towards higher levels of noise, resulting from the installation of lighter and higher speed diesel engines, increased power output per shaft, higher propeller shaft loadings and the placing of the accommodation block aft and nearer the propeller. As a result of this, the Authorities in many countries have issued recommendations or regulations relating to the maximum permitted noise levels in the various compartments and living areas on-board ship.

The noise level in a ship's compartment is a combination of the effects of airborne sound and structure borne sound. One means of reducing structure borne sound is by isolating the surface of a room from the basic structure of the ship. This can be achieved by installing a "floating floor".

One form of floating floor consists of a floor of relatively large mass supported on a mat of relatively flexible glass or mineral wool. Bulkhead linings and partitions are mounted on the floor and are thus insulated from the basic structure of the ship.

It is an object of the invention to provide a construction panel for use in forming the floor of a "floating floor".

According to one aspect of the invention there is provided a construction panel comprising a non-combustible fire-resisting board, for example one comprising a fibre-reinforced cement or calcium silicate binder, faced with metal on one or each of its major faces.

Suitably the metal facing extends not only over the major face(s) of the board but also over the edges thereof, or at least a substantial part of the edges thereof. The metal facing is thus preferably in the form of one or two shallow trays, attached, for example by means of an adhesive, to one or both major faces of the board. If only one major face of the board is metal-faced, the other may be faced with other suitable facing material. The metal facing may for example comprise a galvanised steel veneer, of thickness between 0.2 and 0.6 mm. adhered to the board by means of a neoprene contact adhesive.

The non-combustible fire-resisting board is suitably one reinforced with organic fibres such as cellulose fibres, or inorganic fibres such as glass fibres or mineral wool fibres. The board may contain additives to enhance its non-combustibility and fire-resisting properties, and suitable boards are described for example in our U.K. Patent Specification Nos. 1,404,001 and 1,498,966. Especially suitable boards are those sold under the Trade Marks "CAPE MARINE BOARD", "SUPALUX" and "MONOLUX".

A "floating floor" may be constructed by assembling a number of construction panels according to the invention in edgewise abutting relationship on top of a layer of mineral wool, e.g. a mat or slab of glass or mineral wool. For example, a mat or slab of glass or mineral wool, between say 40 and 75 mm. in thickness, may be laid directly onto the deck of a ship, and a floor laid thereon consisting of construction panels according to the invention.

The present invention also provides a method of jointing construction panels, which although not limited to the construction panels of the invention, is nevertheless especially useful therewith.

According to a further aspect of the invention, therefore, a method of jointing construction panels comprises providing said panels with edge grooves, placing the panels in edgewise abutting relationship, inserting a spline into said edge grooves, and driving a staple into said abutting panels such that the limbs thereof are deflected upon contacting said spline.

Examples of the present invention will now be described with reference to the drawings, which are schematic in nature and in which:

FIGS. 2 and 3 are sections through various parts of a ship's structure, showing the use of the "floating floor" of FIG. 1; and FIG. 4 illustrates the method of jointing according to the invention.

The construction panels of the invention each comprise a non-combustible fire-resisting fibre-reinforced board 10, for example a 19 mm. thick Cape Marine Board, faced on both major faces with a metal veneer 11. The metal veneer, which may be a 0.4 mm. galvanised steel veneer, is turned down over the edges of the board 10, as best seen at 12 in FIGS. 1 and 4.

Figure 1:
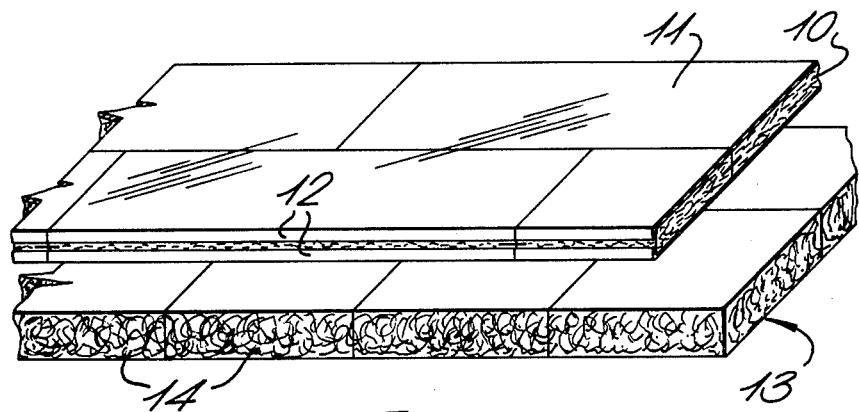
FIG. 1 shows a floor made from construction panels according to the invention laid on a mass of glass or mineral wool to form a "floating floor"
Figure 2:
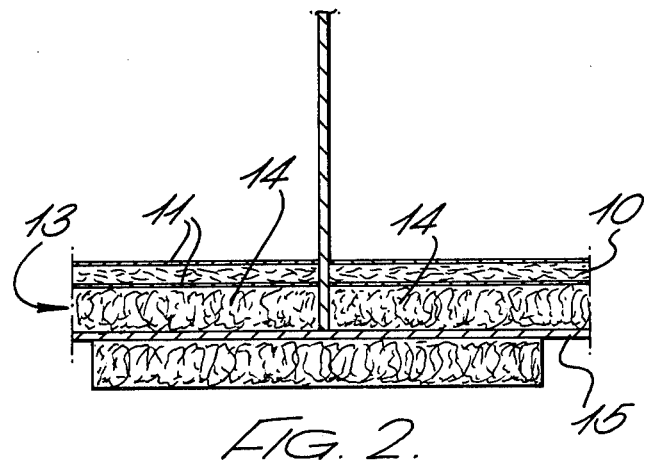

A "floating floor" is constructed by assembling a floor of veneer-faced boards 10 on top of a layer 13 of mineral wool fibres, for example of thickness 50 mm. The layer 13 is illustrated in FIG. 1 as being made up of a plurality of slabs 14. The layer 13 is laid directly on the ship's deck 15, and may for example consist of "Rocksil" (Trade Mark) mineral wool slabs.

The method of jointing the panels is illustrated in FIG. 4. The edges of the panels are provided with longitudinal grooves 16. The metal facing 12 extends along the edges of the panels to a position just short of the grooves 16.

The panels are brought into edgewise-abutting relationship, and are held together, so far as relative vertical movement is concerned, by inserting splines 17 into the groove 16. The splines are suitably steel splines, for example of dimensions 3 mm. × 38 mm. in cross-section. After insertion of the splines 17 staples 18 are driven into the panels across the joint. The limbs of the staples 18 entering the boards 10 must be of a length greater than half the thickness of the construction panel, in order that when their points contact the spline 17 they are deflected by the spline. Typical staples for use with 19 mm. thick boards 10 have a width of 1 mm., a cross length of 9.5 mm., a limb length of 19 mm. and a thickness of 0.5 mm. A suitable deformation of the staple upon contacting spline 17 is shown at the left-hand side of FIG. 4.

The gaps in between the edges of abutting construction panels left by the folds 12 of the metal veneers may suitably be filled with a mastic, such as a butyl rubber, polyurethane or polysulphide.

We claim:

1. A method of jointing construction panels comprising providing said panels with edge grooves, placing the panels in edgewise abutting relationship, inserting a spline into said edge grooves, and driving a staple into said abutting panels such that the limbs thereof are deflected upon contacting said spline.

2. A floor comprising a plurality of construction panels assembled in edgewise abutting relationship, said panels each comprising a non-combustible fire-resistant board faced with metal on at least one of its major faces, edge grooves in each panel, splines inserted in the edge grooves of adjacent abutting panels, and staples driven into said adjacent abutting panels with their limbs deflected by contact with the splines.

3. A floor according to claim 2 wherein said floor is supported on a layer of mineral wool.

* * * * *